H. N. HICKOK.
FRUIT HARVESTER.
APPLICATION FILED JUNE 23, 1919.
1,339,338.
Patented May 4, 1920.
2 SHEETS—SHEET 2.
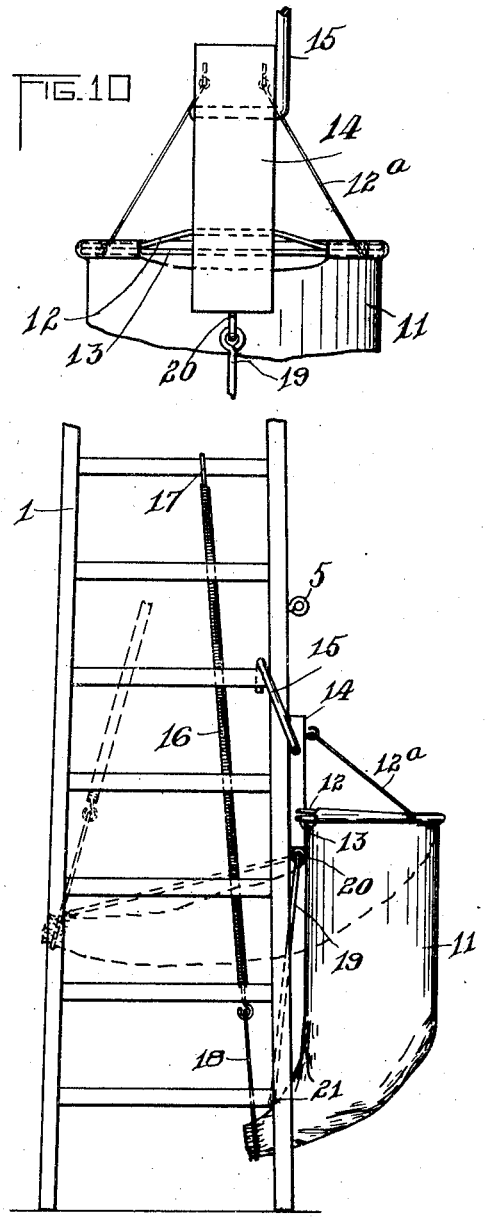
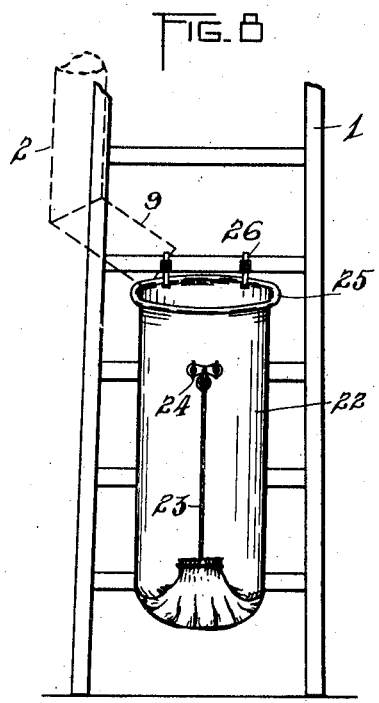
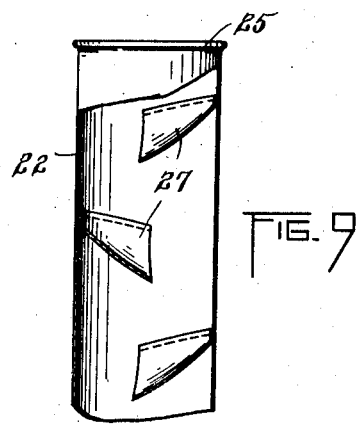
INVENTOR.
Henry N. Hickok
BY
ATTORNEYS.

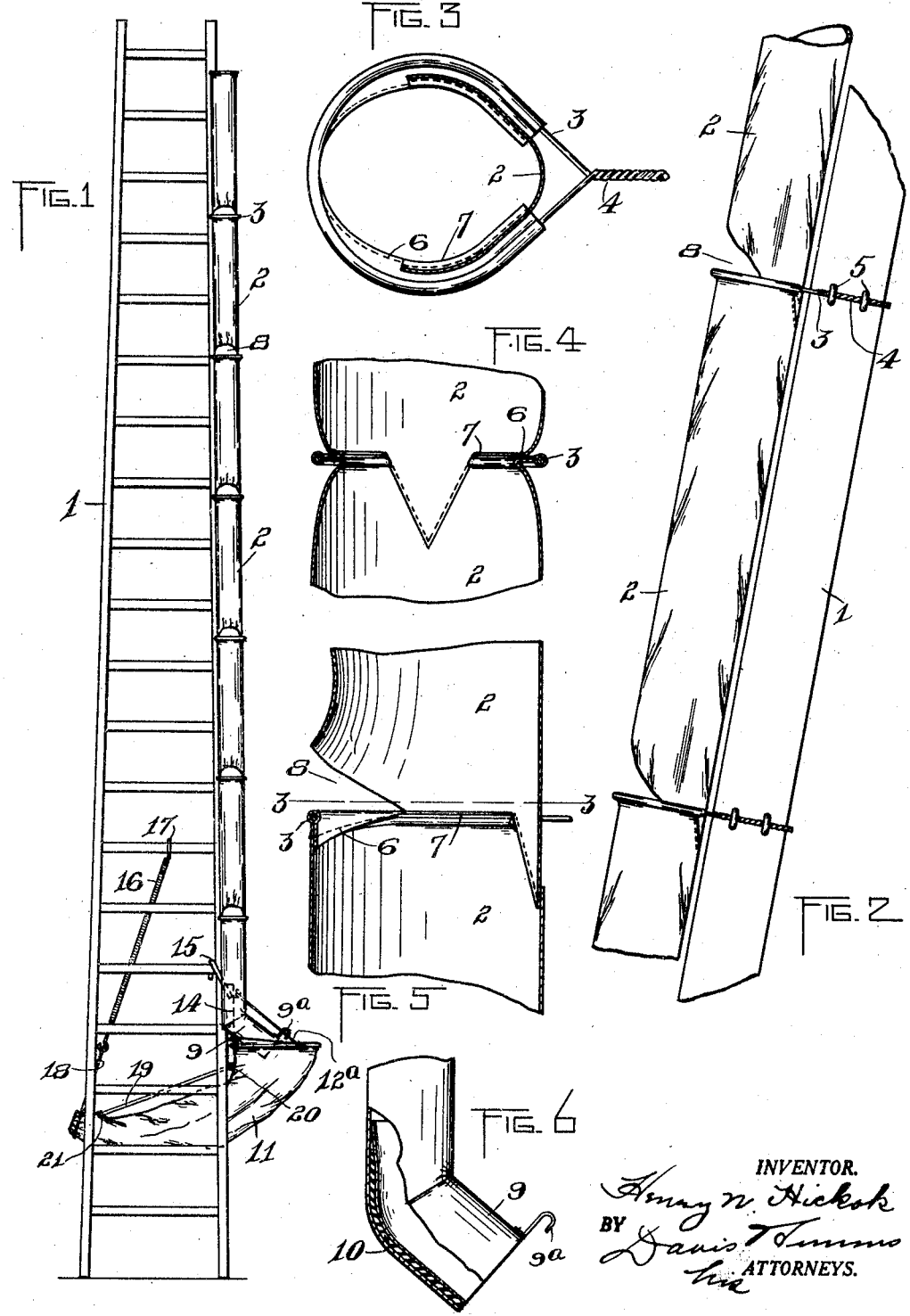

UNITED STATES PATENT OFFICE.

HENRY N. HICKOK, OF ROCHESTER, NEW YORK.

FRUIT-HARVESTER.

1,339,338.  Specification of Letters Patent.  Patented May 4, 1920.

Application filed June 23, 1919. Serial No. 306,105.

*To all whom it may concern:*

Be it known that I, HENRY N. HICKOK, a citizen of the United States, and resident of Rochester, in the county of Monroe and State of New York, have invented certain new and useful Improvements in Fruit-Harvesters, of which the following is a specification.

The present invention relates to fruit harvesters and more particularly to the type employing a conveyer into which the fruit is placed by hand to be conducted to a suitable receptacle at the lower end of the conveyer. An object of this invention is to provide a conveyer having supporting rings to which the conveyer will be so connected that the fruit will not be injured by contact with the rings. Another object of the invention is to provide a conveyer with its discharge end so formed as to direct fruit against the side wall of a bag or receptacle. Still another object of the invention is to provide an improved bag or receptacle which is so supported that the fruit in entering the bag does not strike against the fruit already within the bag or receptacle with hard blows.

To these and other ends the invention consists of certain parts and combinations of parts, all of which will be hereinafter described, the novel features being pointed out in the appended claims.

In the drawings:

Figure 1 shows in front elevation the fruit harvester attached to a ladder;

Fig. 2 is a view in side elevation of a portion of the ladder and the conveyer of the fruit harvester;

Fig. 3 is a section on the line 3—3, Fig. 5;

Fig. 4 is a vertical section through the conveyer adjacent one of the supporting rings;

Fig. 5 is a view of the conveyer adjacent one of the supporting rings, showing a view at right angles to that shown in Fig. 4;

Fig. 6 is a detail view partially in section of the discharge end of the conveyer;

Fig. 7 is a detail view showing the bag or receptacle in the position which it assumes when filled;

Fig. 8 is a view in elevation of another form of bag which may be used with the conveyer;

Fig. 9 is a fragmentary sectional view through the bag or receptacle shown in Fig. 8; and Fig. 10 is a detail view of the manner in which the bag illustrated in Fig. 7 is connected to its supporting block.

Referring more particularly to the drawings 1 indicates a ladder which is employed for supporting the fruit picker and supported on the ladder is the conveyer. This conveyer comprises an elongated tube formed of flexible material and preferably is built of sections 2, each of which has a ring 3 secured to the upper end thereof, said ring having a projection 4 extending therefrom and passing through a pair of eyes 5 on the side of the ladder upright. The lower end of each section 2 is stitched at 6 to the upper portion of the section next below it, preferably to the inner face of said section below the ring 3 so that, when the conveyer is extended, the tension on the upper part of each section through the connection with the lower end of the section next above it is such that a web 7 is formed which tends to hold the fruit passing through the conveyer, away from the ring 3. It is preferred to leave a portion of the lower end of each section unconnected with the next lower section so that a mouth or opening 8 is provided through which fruit may be introduced at different points throughout the length of the conveyer. The lower end of the conveyer has a laterally deflected portion 9 and the outside wall of the bend between this laterally deflected portion and the conveyer proper is reinforced by a thick piece of yielding material 10 such as heavy canvas or rubber which tends to maintain the shape of the laterally deflected portion while at the same time will act as a cushion for the fruit contacting with the bend. A hook $9^a$ at the mouth of the conveyer may be secured to the bag or receptacle 11 into which the conveyer discharges, or to the brace wires $12^a$.

The receptacle 11 in the embodiment shown in Figs. 1, 7 and 10 is in the form of a bag 11 having one or two rings 12 and 13 secured about its mouth and also to a block or supporting member 14 attached to the side face of an upright of the ladder 1, this preferably being secured by a hook 15 which is pivotally connected to the block and engages over a rung of the latter. Brace wires 12ª may extend from the block 14 to the ring or rings 12, 13 to hold the mouth of the bag in a horizontal position.

It is preferred to support the lower end of the bag yieldingly in an elevated position to one side of the mouth in order that the apples will not have far to drop after impinging the side of the bag under the action of the laterally discharged mouth of the conveyer. This may be accomplished by the employment of a helical spring 16 which is anchored at its upper end at 17 to the ladder and has its lower end connected to the draw string 18 which effects the closure of the bottom of the bag. There may also be employed a swinging arm or support 19 pivotally connected at 20 to the block 14 and also connected to the bag at 21 adjacent the discharge mouth or bottom. This swinging arm or support tends to hold the bag extended when it is elevated as shown in Fig. 1, for otherwise the bag would collapse under the action of the spring. As the bag fills, it gradually swings to the position shown in Fig. 7, the spring 16 yielding to permit this movement. The apples do not fall as far when the bag fills as when the bag is empty and as a consequence after hitting the side of the bag, their contact with the apples in the bag is light.

In Figs. 8 and 9 another form of bag is shown. This bag is indicated at 22 and has a draw closure 23 at its bottom which is secured to an attaching device 24 on the side of the bag to hold the bottom closed. The ring 25 of the bag may be supported by hangers 26 from a rung of a ladder 1. The interior of the bag is provided with partitions 27 alternately arranged on opposite side walls of the bag and tending to break the fall of the apples through the bag, due to the fact that they are formed of yielding material and require the apple to travel in a zig-zag path.

From the foregoing it will be seen that there has been provided a conveyer formed of flexible material comprising a number of sections. Each of these sections has a supporting ring at the upper end thereof and the lower end of each section connects with a section below it so as to produce a web which will prevent the fruit contacting with the rings. The lower end of the conveyer is formed to deflect the fruit laterally against the side of the bag in which the fruit is collected. This laterally deflected discharge end maintains its shape through a stiff cushioning device. The bag in which the fruit is collected has its bottom portion yieldingly sustained in an elevated position so that the fruit does not have a long fall after entering the bag. The bottom of the bag gradually lowers under the weight of the apples as it falls. A supporting arm is provided in connection with the bag which tends to prevent the collapse of the bag under the yielding supporting means.

What I claim as my invention and desire to secure by Letters Patent is:

1. In a fruit harvester, a conveyer formed of a number of sections of flexible material, each having a supporting ring at its upper edge, and having its lower end lying within the ring of the section next below it and secured to each section below such ring to provide a cushion for such ring.

2. In a fruit harvester, a conveyer formed of a textile material and having a number of supporting rings secured thereto at spaced points throughout its length, webs being provided between the rings and the passage through the conveyer to prevent contact of fruit passing through the conveyer with the rings.

3. In a fruit harvester, a tubular conveyer having a laterally extending tubular arm supported by it at its lower end, and a cushion secured to the wall of said conveyer at the bend and acting to hold the arm in extended position.

4. In a fruit harvester, a tubular conveyer, a bag into which such conveyer discharges, a pivoted support connected to the bag adjacent the bottom thereof, and yielding means also connected to the bag near the bottom thereof and acting to elevate the bottom of the bag.

5. In a fruit harvester, a conveyer, a bag into which the conveyer discharges, a supporting block, a ring secured about the mouth of the bag and supported at one side of the bag on the block, a supporting arm pivoted to the block and secured to the bag near the bottom of the latter, and a spring secured near the bottom to swing the bag and supporting arm to one side of the bag mouth when the bag is empty.

HENRY N. HICKOK.